May 26, 1925. Re. 16,080

C. S. BURTON

VACUUM FUEL FEEDING DEVICE FOR INTERNAL COMBUSTION ENGINES AND THE LIKE

Original Filed March 22, 1922

Inventor.
Charles S. Burton
by Burton & Burton
his Attorneys.

Witness.
A. Tom Knight

Reissued May 26, 1925. Re. 16,080

UNITED STATES PATENT OFFICE.

CHARLES S. BURTON, OF OAK PARK, ILLINOIS, ASSIGNOR TO STEWART-WARNER SPEEDOMETER CORPORATION, OF CHICAGO, ILLINOIS, A CORPORATION OF VIRGINIA.

VACUUM FUEL FEEDING DEVICE FOR INTERNAL-COMBUSTION ENGINES AND THE LIKE.

Original No. 1,432,381, dated October 17, 1922, Serial No. 545,657, filed March 22, 1922. Application for reissue filed February 26, 1925. Serial No. 11,891.

*To all whom it may concern:*

Be it known that I, CHARLES S. BURTON, a citizen of the United States, residing at Oak Park, in the county of Cook and State of Illinois, have invented new and useful Improvements in Vacuum Fuel Feeding Devices for Internal-Combustion Engines and the like, of which the following is a specification, reference being had to the accompanying drawings, forming a part thereof.

The purpose of this invention is to provide an improved construction of a vacuum fuel feed device having certain advantages over the devices of this type now in use. It consists in the elements and features of construction shown and described, as indicated in the claims.

In the drawings:—

Figure 1:
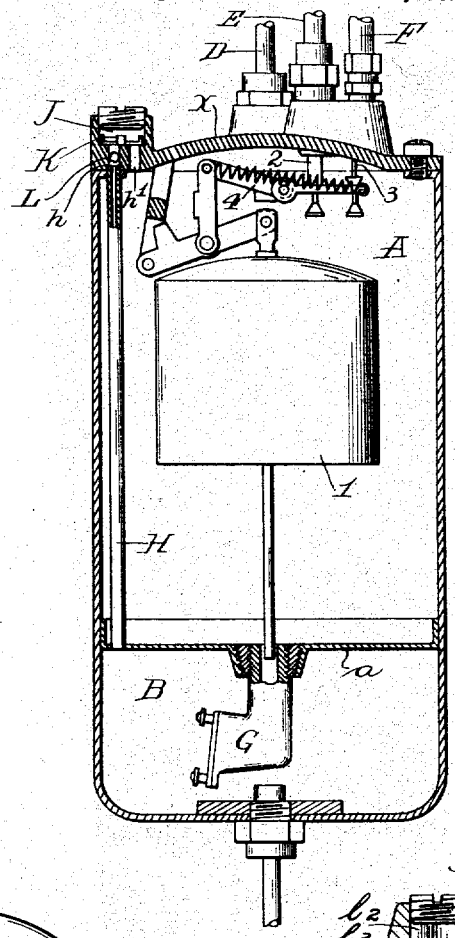
Figure 1 is a section at the line, 1—1, on Figure 2.

The structure shown in the drawings comprises a so-called "vacuum tank" having a receiving or vacuum chamber, A, and a delivery or storage chamber, B, for the liquid fuel. The receiving chamber has the usual connection shown at D, for supplying liquid from a lower source, not shown. It has also a connection shown at E leading to a source of vacuum as the engine manifold or suction-producing device of any sort, not shown. At F there is an atmosphere inlet to the receiving chamber.

Figure 2:
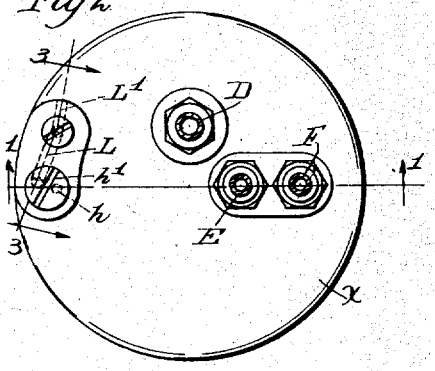
Figure 2 is a partial top plan view of a tank equipped with devices embodying this invention.

Float-operated valve devices alternate the dominance of suction and pressure (usually atmospheric) in the chamber, A, as illustrated in a conventional or familiar form by the float, 1, suction valve, 2, atmosphere valve, 3, and lever snap action, 4, in Figure 2.

The liquid is delivered from the receiving chamber to the delivery or storage chamber past a one-way seating valve, G, which opens with the outflow from the receiving chamber to the delivery chamber, and is adapted to be seated by the suction producing partial vacuum in the receiving chamber. In all these respects the construction is in general in accordance with the familiar type of these devices. The novel feature constituting the invention herein claimed consists in a communication leading back from the delivery chamber into the receiving chamber which, as shown, is by way of a pipe, H, which is intruded liquid-tight through the diaphragm, *a*, which separates the chambers, A and B, opening in the chamber, B, said pipe extending up close alongside the wall of the chamber, A, the passage which it affords being continued in the cap, X, in which all the other connections with the upper chamber are formed, said duct opening through the lower side of said cap into said upper or receiving chamber. This passage comprises intermediate its ends a valve chamber, J, into which both the portions, $h$ and $h^1$, of said duct open through ports whose margins constitute valve seats; and in said chamber there is located a valve, K, which seats by one and the same movement at both said ports, operating as a check valve at both its seatings and adapted to be opened by pressure in either direction,—that is, through the passage, $h$, or through the passage, $h^1$, and to be seated by suction in either direction, to-wit, operating through the passage, $h$, or through the passage, $h^1$. The result is that notwithstanding the suction from the receiving or vacuum chamber, and pressure from the delivery or storage chamber both tend to produce movement through the passage in the same direction, the suction will seat the valve, while the pressure will open it. By this means there is provided opportunity for expansion of the liquid in the delivery chamber,—or of continuous liquid in both chambers when the delivery chamber is entirely full,—to find relief by the liquid passing up through the pipe, H, and ducts, $h$ and $h^1$, into the upper or receiving chamber, whence it may pass in the extreme case over into the main low tank which constitutes the original source. And notwithstanding the liquid can thus be driven from the lower delivery chamber up and back into the upper receiving chamber, nevertheless it cannot be drawn from the lower to the upper chamber by the suction operating in the upper chamber.

Figure 3:
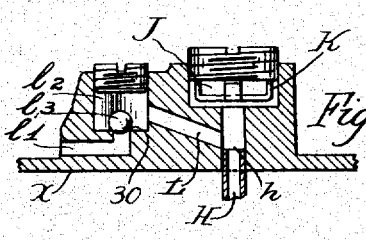
Figure 3 is a section at the line, 3—3, on Figure 2.
Figure 4:
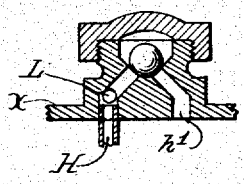
Figure 4 is a detail section at the same plane as Figure 2, showing a detail modification.

In the form shown in Figures 2 and 3, the valve is a flat disk and the two ports in the chamber, J, open through the same flat seat. This is in some respects and for some reasons the preferred form. In Figure 4, however, there is shown a modified form which has certain advantages. In this form the valve is a ball valve seating in a spherically concave seat through which both the ports open, the valve chamber being in general frusto-conical upward from said spherical seat so that the valve in all cases tends to roll into the spherical seat by gravity, and to seat at both ports at once, as in the case of the flat disk valve. Obviously other forms of valve device may be employed, provided always the valve device is such with respect to the port, that the same action of the valve opens both ports.

In order to permit delivery of the liquid fuel from the lower or delivery chamber to the carbureter by gravity, it is of course necessary that there should be an atmosphere vent or access for atmospheric pressure to the delivery chamber. It is convenient and economical to utilize the pipe, H, for this purpose; and this is accomplished by providing in the cap plate, X, atmosphere inlet ducts, $l$, $l^1$, opening into the duct, $h$, anterior to the valve chamber, J, and valve seat, 30, said duct having between the portions, $l$ and $l^1$, a small valve chamber, $l^2$, for a ball valve, $l^3$, which seats by gravity in the upwardly-open end of the portion, $l^1$, of the duct, so as to be opened by the inlet of air to seat against the outward movement of air through said atmosphere inlet.

I claim:—

1. In a vacuum feed device, in combination with a receiving chamber having a fuel supply connection, and means for alternating the dominance of suction and pressure in said chamber, a delivery chamber and a valve-controlled passage for liquid from the first chamber to the second; an additional passage from the delivery chamber back to the receiving chamber, said additional passage comprising a valve chamber having two ports leading respectively to the receiving and delivery chamber, and a valve device seating to close said two ports by one and the same action of said valve device.

2. In the construction defined in claim 1, foregoing, the valve device being a unitary device which seats at both ports at once, and is opened by pressure and closed by suction through either port.

3. In the construction defined in claim 1, foregoing, an air inlet passage to the delivery chamber leading into said additional or second mentioned passage between said valve device and said delivery chamber, and a one-way seating valve in said air inlet passage opening inward and seating against outward movement through said air inlet passage.

In testimony whereof, I have hereunto set my hand at Chicago, Illinois, this 21st day of February, 1925.

CHARLES S. BURTON.